United States Patent Office 3,585,023
Patented June 15, 1971

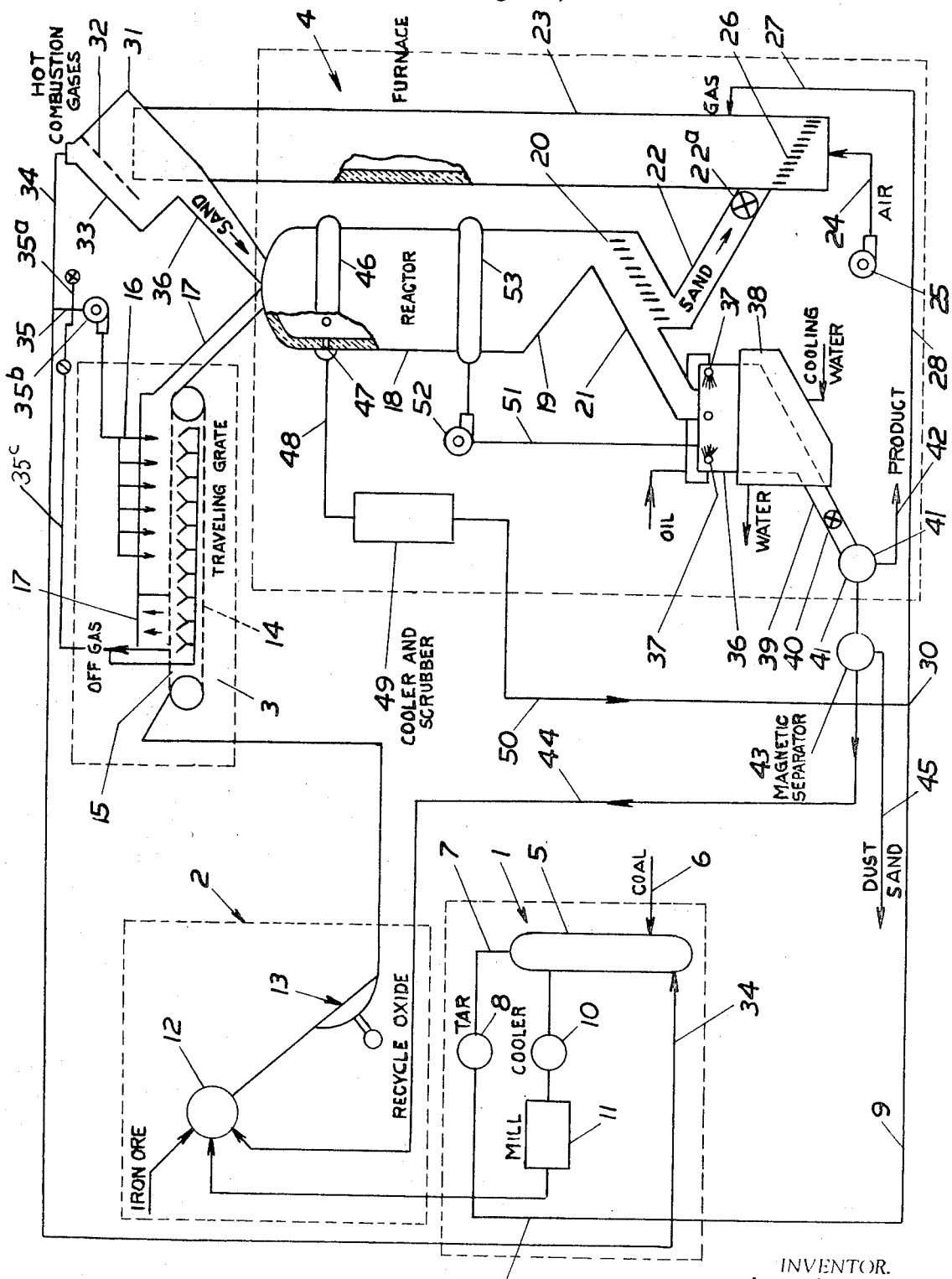

3,585,023
METHOD AND APPARATUS FOR REDUCTION OF IRON ORE
Joseph Vlnaty, Aliquippa, and George A. Snyder, West Mifflin, Pa., assignors to Dravo Corporation, Pittsburgh, Pa.
Filed Aug. 20, 1968, Ser. No. 753,983
Int. Cl. C21b 1/08; F27b 21/00
U.S. Cl. 75—4                                18 Claims

ABSTRACT OF THE DISCLOSURE

There is disclosed a method and apparatus for effecting partial or substantially complete conversion of iron oxide agglomerates by forming the agglomerates, such as pellets with admixed reductant, and then introducing the pellets into a heat exchange medium of highly-heated non-reactive solid particles.

---

This invention relates to the processing of iron oxide agglomerates to reduce the oxide wholly or partially to metal, or to a lower oxide whereby they form improved ore bodies for reduction in a blast furnace, or which may be used for conversion to steel and thereby bypass completely the blast furnace in the steel-making operation.

BACKGROUND OF THE INVENTION

Beneficiation of natural ores of magnetite and hematite is now commonly practiced by forming finely-divided ore concentrates which are too fine for introduction directly into the blast furnace stock column into agglomerates, such as pellets or briquettes. Agglomeration of other iron oxide, such as flue dust from blast furnaces or open-hearth furnaces, either alone or mixed with natural ore concentrates may also be effected.

Agglomeration may be practiced by briquetting the oxide material under pressure, with or without a binder, or by rolling the fine particles, slightly dampened, into pellets. In either case the formed bodies are too fragile for shipping, storage or use in the blast furnace, wherefore it is necessary to apply heat in some manner to heat-harden or indurate the ore bodies. One common procedure is to fire the formed bodies on a traveling grate which carries the bodies progressively through drying, preheating, firing and cooling zones, or to charge the pellets into the top of a stack furnace through which they descend through similar successive less well-defined zones, finally being discharged from the bottom of the furnace. In the case of magnetite ore, it is not unusual to oxidize the ore to hematite, utilizing heat generated from this reaction to harden the pellets and reduce fuel requirements, and in the case of hematite ore, fuel particles may be mixed into the ore to combine with preheated oxidizing gases to generate heat to harden the pellets on the grate or in the stack furnace.

PRIOR METHODS

Consideration has been given to effecting the partial or complete reduction of the agglomerates to metal or a lower oxide, as FeO combined with metal. Difficulty with such procedure arises from several sources whether the apparatus was a shaft furnace, a rotary kiln, or a traveling grate. Among these are the welding or sintering of the preformed aggregates into a bonded mass when reducing temperatures are encountered, with many attendant disadvantages. Another is the maintenance of a reducing atmosphere both in firing and in cooling. Still others arise from the time factor, because of the relatively slow heat transfer from the surface to the interior of the pellet, and the destructive effect of the long exposure of the apparatus to excessively high temperatures, especially where a traveling grate machine is used. Among the more important difficulties is also that of securing uniformity due to different conditions that prevail, as between the top and bottom agglomerates in the bed on a traveling grate or rotary kiln, and as between the center and sides of the mass in a stack furnace. Increasing temperature to shorten time or accelerate heat penetration through the mass is not feasible, since there is a definite limit beyond which the exposed material would rapidly sinter before unexposed material would reach a reaction temperature.

BRIEF SUMMARY OF INVENTION

According to the present invention, reduction of a very substantial part of the ore in the agglomerates to metal and a lower oxide of iron is effected by combining with the ore a fossil fuel, such as coal or coke, or a char made from coal, and desirably the less expensive fossil fuels, such as lignite, sub-bituminous and non-coking coal and forming the mixture into agglomerates, which, after being heated to some extent, are mixed with a substantially larger mass of highly-heated non-reactive flowable solid particles, such as sand, with the sand and agglomerates confined in an enclosure, preferably a vertical column. The envelopment of the agglomerates in a mass of highly-heated small particles substantially isolates each body from close contact with one another and quickly heats them through, while confining them against rupture through internal forces or mechanical stresses due to high hydrostatic pressures in the column. When a temperature of reaction is reached, the fuel particles in the agglomerates react with oxygen in the iron oxide. This is an endothermic reaction, producing CO along with some $CO_2$, and the CO gas may be used in apparatus accessory to the reactor as a fuel. As the reduction reaction diminishes, the granular material and agglomerates, partially or nearly fully reduced, as may be predetermined, progress as a mass toward a discharge area where the granular material is separated out and the pellets cooled before they are exposed to the atmosphere. After having been cooled, they may be tumbled and cleaned of any adhering grains of the granular material.

An important object of the invention is to provide a novel method of and apparatus for reducing iron oxide agglomerates partially or more or less completely to metal economically and with relatively low plant investment as compared to apparatus heretofore proposed.

A further important object is to provide a method and apparatus wherein the extent of reduction may be controlled. For instance, agglomerates, such as pellets for use in blast furnaces, may require the conversion of a lower percent of the oxide to metal, but where the pellets are to be used for direct conversion to steel, eliminating the blast furnace entirely, a high percentage of metal in the product is necessary.

A further incidental advantage is that lower grade fuels may be used, such as non-coking coal, lignite and sub-bituminous coal.

These and other objects and advantages are secured by the invention as more fully described in connection with the accompanying drawing, wherein:

The figure illustrates schematically a plant embodying the invention, and is also a flow diagram illustrating the process.

To achieve the greatest economy, the invention is embodied in a plant where coal, if it is to be provide the reducing agent, is converted to a char which is then reduced to a fine granular state or powder. This is mixed with the iron oxide, agglomerated into pellets, and then dried, preheated and conditioned. The hot pellets or other agglomerates are then discharged into the reactor along with a greater volume of highly-heated sand or like medium comprising inert particulate material that does not melt or flux at the temperatures here involved. The drawing therefore shows an integrated plant including that equipment desirably associated with the reactor, as well as the reactor itself, but the invention is not confined to having all of this apparatus organized into a complete plant.

In the drawing, broken lines outline different general parts or areas of the plant. Block 1 is the fuel preparation apparatus. The numeral 2 designates generally the mixing of the fuel and ore and its conversion into agglomerates. The apparatus in area 3 is for drying, preheating and conditioning the agglomerates, and 4 is the reactor itself with its medium heating equipment and apparatus for discharging the final product.

Fuel preparation, block 1, comprises a retort, schematically indicated at 5, into which coal, preferably a low sulfur, non-coking bituminous or sub-bituminous coal or lignite, is delivered as indicated by arrow 6. This fuel is heated in the retort and converted into a char. The volatiles leave the retort through pipe 7 and condensible by-product, principally tar, is collected in a vessel 8, while the non-condensible fuel gas is carried away through pipe 9, or both tar and gas may be removed through this pipe if they are to be burned together.

Char from the retort is transferred to a cooler 10 and then to a mill 11 where it is reduced to a fine granular or powder-like state for pelletizing.

From the mill 11 the finely-ground char or other carbonaceous fuel is delivered to a mixer 12, block 2, where it is combined with iron oxide from an iron oxide source (not shown). The iron oxide may be natural ore or ore concentrate in finely-divided form, flue dust, iron oxides from other sources, or mixtures thereof. The ratio of carbon to iron oxide is adjusted to suit the end use of the finished pellets.

The mixture from the mixer 12 is fed to a pelletizer 13, such as a pelletizing drum or disk where the mixture, with the usual amounts of water, perhaps 8% to 14% of water, and a binder if required, is rolled into pellets, or the mixture may be otherwise agglomerated. The green pellets are conveyed immediately to a drying and preheating apparatus 14, indicated in block 3 as a traveling grate machine. In this machine the green pellets are carried on a traveling grate 15 first through an initial drying zone where heated gases pass through the grate and then through the bed of pellets, this being known in the art as updraft drying. Following this drying, the pellets are preheated and pre-reduced or conditioned by firing to a temperature, at least above 1500° F. and preferably to around 1800° F. Hot gases in these zones generally are downdraft. The gases may be reducing or inert, or may even have a small percentage of oxygen. The short exposure time of the agglomerates to the heating gases and proper proportions of reductant allow the gases to be slightly oxidizing.

All of the apparatus so far described is well known in the art, and has only been conventionally shown in the drawing. However, the usual traveling grate machine also has a cooling zone, but with the present invention the pellets at a temperature between 1500° F. and 1800° F. are discharged into a chute 17 leading into the top of the reactor.

The reactor, block 4, is a vertical column 18 into the top of which the chute 17 discharges. It is refractory-lined. There is a hopper-like bottom 19 with an inclined grate structure 20 below the hopper. The grate will not permit the pellets to pass through it, but will allow the granular heating medium, such as sand, to sift through it. At the lower end of the grate there is a closed discharge chute 21, and below the grate there is a chute 22.

Alongside the reactor column there is an air lift furnace also of a known construction. It comprises a refractory-lined tube-like column 23 having a closed bottom with an air inlet pipe 24 opening into it for supplying an updraft of air from a blower 25. Openings in a plate 26 above the bottom divides the air flow into several jets in order to secure a more uniform updraft. Chute 22 from the reactor opens into the air lift furnace above this plate, and there is some means to exclude air from blowing up through chute 22, schematically indicated as a star wheel feeder 22a, but which may take various forms, the most simple of which would be to have the chute 22 of sufficient length that a column of sand in the chute would overcome the backflow of gases from the heater 23 into the reactor. Fuel is introduced into the heater column at 27, and while this may be liquid or gaseous fuel, we prefer to use gas or gas and tar supplied at least in part through pipe 28 connected with pipe 9 from the coal char plant at a junction 30. In some cases it may be desirable to have this heater extend concentrically up through the reactor, instead of locating it alongside the reactor.

At the top of the airlift furnace there is an enclosure or hood 31 into which the furnace discharges hot granular material and combustion gases. The granular material is deflected downwardly by a baffle plate 32, and there is a hot gas outlet passage 33 through which the spent but hot combustion gases flow. Some of these gases may be conducted through a conduit 34 to the retort 5, and a major part of them may be delivered through branch conduit 35 to the traveling grate machine or other preheater. To reduce the temperature of these gases before supplied to the preheater, atmospheric air may be introduced into the gases through a damper controlled inlet 35a, and 35b is a blower for blowing the mixture into the preheater. In lieu of admitting air for this purpose or in addition to some air in this way, recycled off gases from the preheater may be used and this is indicated in the drawing by the damper controlled line 35c, and for restricting the oxygen content of the gases, this recycle is preferred.

The sand or other inert heat transfer medium is discharged from the enclosure 31 through chute 36 into the top of the reactor along with the hot pellets from the traveling grate machine.

The pellets that are discharged through chute 21 at the bottom of the reactor are discharged into a cooler. This may comprise an enclosure 36 with oil sprays 37 arranged to initially quench and cool the hot pellets but other cooling arrangements may be provided. The lower portion of this enclosure may be surrounded by a water jet 38. After initial quenching, pellets falling to the inclined bottom of the enclosure pass out chute 39. There is a star wheel feeder 40 in this chute, or other means for preventing atmospheric air from flowing up the chute 39 into the enclosure, while the pellets are discharged into a cleaner, such as a rotating drum 41, where any adhering sand is removed, and in which final cooling can be accomplished by spraying water onto the drum. The cleaned pellets, cooled to a temperature below that where the pellets may re-oxidize, are discharged from the drum at 42. Fines released from the pellets in the drum are passed to a magnetic separator 43. Metal particles that are separated from these fines are delivered to a mixer 12, as indicated by flow line 44, while dust and sand are discharged at 45 for reclamation of sand or other disposition not important to this invention.

As will be hereafter more fully explained, the reducing process in the reactor will result in the generation of a combustible gas, principally CO. This gas is removed from the reactor by providing a gas offtake 46 that encircles the reactor near the top, radial ports 47 providing for the passage of gas from the reactor into the offtake. Pipe 48 conveys this gas to a washer and cooler 49 on a known or preferred construction, and the cleaned gas, which is combustible, flows through pipe 50 that is joined to pipes 9 and 28 at junction 30 to also provide fuel to the air-like furnace.

The optional use of oil to quench the very hot pellets will result in cracking some or all of the oil, releasing hydrogen and hydrocarbon vapors. The gas is drawn off through pipe 51 and pump 52 and introduced to the lower portion of the reactor through pipe 53 and gas supply ring 54 encircling the reactor, and constructed similarly to the gas offtake ring 46 to provide a means for reducing the sulfur content of the pellets. The hydrogen sulfide which is produced will be removed in the scrubber before the combustible gases are burned as fuel.

According to the method the pellets or other agglomerates are formed of a mixture of finely-divided iron oxide of the fineness commonly used in making pellets or briquettes, together with char reduced to about the same fineness. While we have described char produced from coal or lignite as the preferred reductant, other fossil fuel or carbonaceous material may be used. The green pellets being quite friable, are dried, preheated and then fired to a high enough temperature on the traveling grate machine to withstand the conditions which are encountered in the reactor. As explained above, preheating and pre-reduction or conditioning are desirably carried out in a non-oxidizing or only slightly oxidizing atmosphere to preserve the char, or any other carbonaceous reducing agent in the pellets. The pellets may be brought to a temperature as high as about 1800° F. or 1900° F., but this is approximate, as some ores may contain fluxing impurities that would require a lower temperature, while other ores might desirably be brought to a higher temperature.

When the final temperature on the traveling grate is reached, the pellets are discharged immediately into the top of the reactor. At the same time that the pellets are being fired and discharged into the reactor, the heat transfer medium, comprising loose granular material that does not react with iron or iron oxide under the conditions here encountered and is otherwise stable, such as silica sand, alumina or silicon carbide, is carried by air and combustion gases up through the air-lift furnace 23 and the particles thereof quickly heated to a high temperature, even as high as about 2600° F. The heated sand being discharged from the top of the furnace immediately flows through chute 36 into the top of the reactor as the pellets are also discharging into the reactor. The preferred approximate ratio of sand to pellets is about 6 pounds of sand to 1 pound of pellets, so that the pellets are scattered through the larger volume of sand and out of intimate contact with one another. As the already hot pellets become enveloped in the sand, their temperature is rapidly raised with the heat penetrating quickly to the center of the pellets, which typically range from ⅜″ to ¾″ in diameter. In this environment the pellets are protected from mechanical and thermal shock and out of contact with air.

Reaction of the carbonaceous reducing agent with the iron oxide takes place in some range between 1900° F. and 2500° F. with the production of carbon monoxide. The gas which is produced in the reaction is removed through gas offtake ring 46 for use as fuel in the manner heretofore explained.

The operation is continuous with pellets entering at the top and being enveloped in hot sand, descending at a rate that will depend on rate of input, the rate of removal, the height of the reactor, and the size of the pellets. Feeding devices such as vibrators may also be used at the bottom of the reactor to accelerate the descent. The sand should not be heated to the point where it softens, and for very high temperatures, say above 2600° F., other granular material than silicon dioxide may be used. A practical limit for the pellet temperature is about 2300° F., but more than 2100° F. is generally not necessary.

In a specific example, pellets of ½ inch diameter which initially contained 85% iron ore concentrate and 15% carbon by weight were contacted in the enclosed environment with sand as the heat transfer medium, the sand being at a temperature of 2500° F. It was found that after a residence time of approximately ten minutes in the reactor, the approximate analysis of the pellets was:

| | Percent |
|---|---|
| Fe(total) | 89.5 |
| Fe(metallic) | 85.0 |
| $SiO_2$ | 6.0 |

The sand or like particulate material not only excludes oxygen, but is a cushioning and protective medium for the pellets and keeps them from destructive contact with one another. Heating in the reactor is uniform, and heat transfer is very rapid. The time for reducing pellets to 90% or higher Fe metal is several minutes in contrast to the much longer time required in most other processes, and pellets reduced to this extent can be used directly in steel making, by-passing the blast furnace completely. The oxide not completely reduced is mostly FeO. For use in blast furnaces, the process may be carried out with less reduction than where a high percentage of iron is desired, and the reactor time may be shorter.

An advantage of this method is that the metallized pellets are somewhat oxidation-resistant after they are reduced, due to the high temperature reaction on grain growth, causing shrinkage and therefore less porosity.

While we have described particularly a preferred method and apparatus for the practice of our invention, it will be understood that various changes may be made therein. While the invention is primarily applicable to the reduction of iron ore, it may be applied to the processing of other ore agglomerates.

We claim:
1. Apparatus for the reduction firing of agglomerates comprised of oxidic ore and a carbonaceous reducing agent comprising:
   (a) a reactor comprising an enclosure having inlet and outlet ends,
   (b) means for introducing agglomerates to be reduced and highly heated inert particles into one end of the enclosure,
   (c) means at the other end closed against the admission of atmospheric air for separating the particles and agglomerates,
   (d) means also closed against the admission of air for receiving the agglomerates so separated and cooling them, and
   (e) means for receiving the separated particles, reheating them and returning them to said means for introducing the particles to the enclosure.

2. Apparatus as defined in claim 1 wherein there is a means for preheating the agglomerates and discharging them hot into said means through which the agglomerates are introduced into the reactor.

3. Apparatus as defined in claim 2 wherein the means for heating the particles utilizes fuel, and means for conducting hot combustion gases from said particle-heating means to the means for preheating the agglomerates.

4. Apparatus as defined in claim 1 wherein means are provided for transferring combustible gases from the reactor to the means for heating the particles.

5. Apparatus for the reduction firing of agglomerates comprising oxide ore and a reducing agent as defined in claim 1 wherein the means for receiving the agglomerates and cooling them comprises an enclosed spray chamber.

6. Apparatus as defined in claim 5 wherein the spray chamber has oil spray nozzles positioned to quench agglomerates as they enter the chamber.

7. Apparatus as defined in claim 6 wherein there is means for conducting gases from the chamber to the reactor intermediate the ends of the reactor.

8. Apparatus as defined in claim 1 wherein the enclosure constituting the reactor is a vertical column and the means for introducing agglomerates and heated particles is at the top of the enclosure and the agglomerates and particles descend toward the other end by gravity.

9. Apparatus as defined in claim 8 wherein the means for reheating the particles is an air-lift furnace comprising a hollow vertical column extending parallel with the reactor, the reactor having a chute at its lower end that opens into the lower end of the furnace column through which particles after being separated from the agglomerates are transferred to the lower end of the furnace column, said chute being arranged to prevent backflow of air from the furnace to the reactor.

10. Apparatus for the manufacture of agglomerates comprising iron oxide and finely-divided char comprising:
 (a) means for reducing solid fossil fuel to char and extracting gas and volatiles therefrom,
 (b) a mill for reducing the char to powder,
 (c) means for mixing iron ore with the char and compacting it into formed bodies,
 (d) means for receiving the agglomerates so formed and preheating them,
 (e) a reactor and means for discharging hot agglomerates from the traveling grate machine into the reactor, the reactor comprising a vertical refractory-lined hollow column with said means for discharging agglomerate into it being at the top thereof,
 (f) an air-lift furnace for heating sand in a rising current of a combustion gases,
 (g) means at the top of the air-lift furnace for separating gases from the heated sand and transferring the hot sand into the top of the reactor,
 (h) the lower end of the reactor having a hopper-like portion through which sand and agglomerates are discharged from the reactor and which is closed against the inlet of air, including means for separating the sand and delivering it hot to the lower portion of the air-lift furnace,
 (i) means for conducting hot combustion gases from the air-lift furnace to the agglomerate preheating means, and
 (j) means for conducting fuel gas from the means for reducing coal to char to the air-lift furnace.

11. The process of reduction firing of iron oxide comprising:
 (a) mixing iron ore with a reducing agent,
 (b) forming the mixture into agglomerates,
 (c) preheating the agglomerates in a non-oxidizing atmosphere of waste gases to a temperature in the range between 1500° F. and 1900° F. and while so heated charging them into an enclosed environment from which air is excluded together with inert particles heated to a temperature and in an amount sufficient to raise the temperature of the agglomerates into the range between 1900° F. and 2500° F. to effect a reducing reaction between the ore and the reducing agent and produce within the enclosure carbon monoxide, utilizing the carbon monoxide to effect the heating of said inert particles,
 (d) utilizing combustion gases which have been first used to heat said inert particles as the non-oxidizing atmosphere for preheating the agglomerates, and
 (e) separating the particles and agglomerates after the required reduction has been effected and at least partly cooling the reduced agglomerates before exposing them to the atmosphere.

12. The process of reduction firing of iron ore agglomerates as defined in claim 11 in which the weight ratio of hot particles to agglomerates is in the range of 6 to 1 to 10 to 1.

13. The process as defined in claim 11 in which the agglomerates are pellets in the size range between three-eights of an inch and three-quarters of an inch in diameter.

14. The process as defined in claim 11 in which the enclosed environment is a hollow vertical column and the agglomerates and hot particles are introduced continuously at the top and are continuously discharged and the particles separated from the agglomerates, and the particles, still hot, are recycled to a heating furnace for return to the top of the closed environment and the agglomerates, after separation from the particles, are first quenched with an oil spray, and gas resulting from contacting the hot pellets with oil is discharged into said closed environment.

15. In the process of reduction firing of iron oxide, the steps comprising:
 (a) mixing iron ore with a reducing agent,
 (b) forming the mixture into agglomerates,
 (c) charging the agglomerates into an enclosed environment with hot solid inert particles as a heating medium,
 (d) excluding oxygen from the enclosed environment,
 (e) separating the particles and the agglomerates after the required reduction has been effected and at least partly cooling the reduced agglomerates before exposing them to the atmosphere,
 (f) said enclosed environment comprising a hollow vertical column and the agglomerates and hot inert particles are introduced continuously into the top and the agglomerates and particles are separated and continuously discharged from the bottom thereof, and particles still hot are recycled to a heating furnace where they are heated and returned to the top of said column.

16. The process defined in claim 15 wherein the agglomerates after separation from the particles are first quenched with a spray of oil and thereafter discharged into the atmosphere.

17. The process defined in claim 15 wherein the reaction of the reducing agent with the iron oxide at high temperature produces carbon monoxide and the carbon monoxide so generated is withdrawn from the closed environment and used as fuel in the process.

18. The process defined in claim 15 wherein the reaction of the reducing agent with the iron oxide at high temperature produces carbon monoxide and the carbon monoxide so generated is withdrawn from the closed environment and used as fuel for heating the particles in the heating furnace.

References Cited

UNITED STATES PATENTS

| | | | |
|---|---|---|---|
| 1,434,484 | 11/1922 | Crist | 75—37 |
| 2,530,274 | 11/1950 | Weber | 263—19BX |
| 3,012,970 | 12/1961 | Banks et al. | 75—4 |
| 3,205,066 | 9/1965 | Rokon et al. | 75—37X |
| 3,432,287 | 3/1969 | Greaves et al. | 266—21X |
| 3,427,148 | 2/1969 | Peters et al. | 75—37X |

ALLEN B. CURTIS, Primary Examiner

U.S. Cl. X.R.

75—36, 37; 263—19; 266—20